US012312238B2

(12) United States Patent
Ajiri et al.

(10) Patent No.: US 12,312,238 B2
(45) Date of Patent: May 27, 2025

(54) ORGANICALLY MODIFIED BORON NITRIDE PARTICLE, AND METHOD FOR CONTINUOUSLY PRODUCING SAME

(71) Applicant: Super Nano Design Co., Ltd., Sendai (JP)

(72) Inventors: Tadafumi Ajiri, Miyagi (JP); Takio Noguchi, Sendai (JP)

(73) Assignee: Super Nano Design Co., Ltd., Miyagi (JP)

( * ) Notice: Subject to any disclaimer, the term of this patent is extended or adjusted under 35 U.S.C. 154(b) by 0 days.

(21) Appl. No.: 17/997,625

(22) PCT Filed: Mar. 28, 2022

(86) PCT No.: PCT/JP2022/014863
§ 371 (c)(1),
(2) Date: Oct. 31, 2022

(87) PCT Pub. No.: WO2022/210484
PCT Pub. Date: Oct. 6, 2022

(65) Prior Publication Data
US 2023/0166971 A1 Jun. 1, 2023

(30) Foreign Application Priority Data
Mar. 30, 2021 (JP) .................. 2021-056878

(51) Int. Cl.
*C01B 21/064* (2006.01)
(52) U.S. Cl.
CPC ................ *C01B 21/0648* (2013.01)

(58) Field of Classification Search
None
See application file for complete search history.

(56) References Cited

FOREIGN PATENT DOCUMENTS

| | | | |
|---|---|---|---|
| JP | 2012-121744 | A | 6/2012 |
| JP | 2013-034952 | A | 2/2013 |
| JP | 2013-234237 | A | 11/2013 |
| JP | 2015-93790 | A | 5/2015 |
| JP | 2015-093790 | A | 5/2015 |
| WO | 2021/010473 | A1 | 1/2021 |

OTHER PUBLICATIONS

Ge et al.; CN107324296; translation provided by Google translate, Mar. 15, 2024.*

* cited by examiner

*Primary Examiner* — Guinever S Gregorio
(74) *Attorney, Agent, or Firm* — Simpson & Simpson, PLLC; S. Peter Konzel (57) ABSTRACT

The problem to be solved is to provide a boron nitride particle stably and efficiently with a high organic modification ratio.
To solve the problem, the continuous production method according to the present invention comprises contacting step for continuously supplying a boron nitride with pretreatment and an organic modifier to continuously contact them with an aqueous material in a subcritical state in a presence of an acid or a base. The pretreatment comprises any one or more kinds selected from adding an acid to the boron nitride, adding a base to the boron nitride, adding an oxidant to the boron nitride, adding a reductant to the boron nitride, and conducting a hydrothermal treatment or a solvothermal treatment to the boron nitride.

8 Claims, 4 Drawing Sheets

ORGANICALLY MODIFIED BORON NITRIDE PARTICLE, AND METHOD FOR CONTINUOUSLY PRODUCING SAME

CROSS REFERENCE TO RELATED APPLICATIONS

This application is the National Stage of, and claims priority under 35 USC 371 to, International App. No. PCT/JP2022/014863, filed Mar. 28, 2022, which application claims priority to Japanese Pat. App. No. 2021-056878, filed Mar. 30, 2021, each of which application is incorporated herein by reference in their entireties.

TECHNICAL FIELD

The present invention relates to an organically modified boron nitride particle and a method for continuously producing the same.

BACKGROUND ART

As heat-generating electronic components such as central processing units (CPUs) have become smaller and more powerful, the amount of heat per unit area generated by these electronic components has become very large. To keep these heat-generating electronic components from breaking down over a long period, cooling of the heat-generating electronic components is required. Metallic heat sinks or casings are used for cooling.

By the way, if the heat-generating electronic component is simply contacted with a heat sink or the like, microscopically speaking, air exists at the interface, whereby the heat conduction is prevented. Therefore, thermally conductive materials are used to efficiently transfer the heat from the heat-generating electronic component to a cooling part such as a heat sink or a casing. By placing a thermally conductive material at the interface between the heat-generating electronic component and the cooling component such as a heat sink instead of the air, the heat can be efficiently transferred from the heat-generating electronic component to the cooling component.

To achieve a high thermal conductivity of the thermally conductive materials, a resin molded body filled with boron nitride powder as a thermally conductive material has been proposed. However, since the boron nitride powder has a scale shape and has a low affinity with a resin, it is difficult to fill the resin in a high amount and a high thermal conductivity cannot be achieved, as a result. Highly filling results in the formation of a void, whereby the thermal conductivity is deceased. In addition, the viscosity is drastically increased, which results in adversely affecting the molding processability and adhesiveness. Therefore, there is a problem to enhance the affinity of a boron nitride powder with a resin.

To solve this problem, an organic modification on the surface of the powder while dispersing a boron nitride powder in supercritical or subcritical water has been proposed (see, for example, Patent Document 1).

PRIOR ART DOCUMENT

Patent Document

Patent Document 1: JP 2012-121744 A

SUMMARY OF THE INVENTION

Problem to be Solved by the Invention

However, if the surface property of the boron nitride powder is hydrophobic, the powder may not be dispersed in water or may be floated in water, whereby the powder may hardly be reacted with an organic molecule. In such cases, even if the reaction can be conducted in a small batch-type apparatus, a stable boron nitride slurry must be supplied to a reactor by a high-pressure pump when continuous production is conducted. In addition, an organic modification to achieve a high thermal conductivity while maintaining formability and adhesion must optimally be controlled for the characteristics of the modifier and the modification density.

In addition, in the technology field of boron nitride powder, there is a need to further increase the modification ratio of the organic modification, to realize an even smaller and more powerful heat-generating electronic component.

The methods described in Patent Document 1 are all hydrothermal synthesis methods using a batch-type reactor (batch-type reactor). Therefore, there is a need to provide a production system with a continuous reactor for enhanced productivity.

By the way, there are known methods for producing a boron nitride powder that is a raw material, such as (1) methods by the reaction of melted anhydrous boric acid ($B_2O_3$) with nitrogen or ammonia ($NH_3$) catalyzed by calcium phosphate ($Ca_3PO_4$) catalyzed reaction; (2) methods by the reaction of boric acid or an alkali boride with an organic nitrogen compound such as urea, guanidine, or melamine ($C_3H_6N_6$), in a high-temperature nitrogen-ammonia atmosphere; (3) methods by the reaction of melted sodium borate ($Na_3BO_3$) with ammonium chloride in an ammonia atmosphere; and (4) methods by the reaction of boron trichloride ($BCl_3$) with ammonia at a high temperature. The characteristics and reactivity of the boron nitride powder obtained vary greatly depending on the type of production method. For example, some boron nitride powders can be dispersed in water, while others may be floated in water.

When a production system using a continuous reactor is realized, the boron nitride powder must form a homogeneous phase with the aqueous material to form a slurry feed. If the boron nitride powder is floated in the aqueous material or is gelated when adding the boron nitride powder to the aqueous material, boron nitride particles cannot continuously be provided. In addition, if the surface characteristics of the boron nitride powder that is a raw material must be controlled and impurities in the boron nitride powder must be removed, the organic modification with high efficiency and reproducibility cannot be achieved.

The amount of hydroxy and amino groups on the surface of the boron nitride powder varies depending on the condition of the hydrothermal synthesis, which makes it impossible to optimize the organic modification.

The present invention has been made because of these problems, and the purpose is to provide a boron nitride particle stably and efficiently with a high organic modification ratio.

Means of Solving the Problem

As a result of the inventors' diligent research to solve the above-mentioned problem, they have found that a boron nitride with prescribed pretreatment and an organic modifier is continuously supplied and is continuously contacted with an aqueous material in a subcritical state in a presence of an acid or a base, which leads to solving the above-mentioned problem to achieve the present invention. Specifically, the present invention provides the following.

The invention according to a first embodiment provides a method for continuously producing an organically modified boron nitride particle, comprising: contacting step for continuously supplying a boron nitride with pretreatment and an organic modifier to continuously contact them with an aqueous material in a subcritical state in a presence of an acid or a base; wherein the pretreatment comprises any one or more kinds selected from adding an acid to the boron nitride, adding a base to the boron nitride, adding an oxidant to the boron nitride, adding a reductant to the boron nitride, and conducting a hydrothermal treatment or a solvothermal treatment to the boron nitride.

The invention according to a first embodiment makes it possible to remove impurities in the boron nitride as a raw material by the pretreatment.

Also, the B—N bond in the boron nitride powder as a raw material can be exchanged with, for example, —BOH and HN—, —B(OH)$_2$ and H$_2$N—, or the like, which results in enhancing the solubility in an aqueous solvent. Thus, a slurry feed can be provided as a raw material liquid, and the raw material liquid can stably be supplied.

In addition, in the contacting process, since a boron nitride with pretreatment and an organic modifier is continuously supplied and continuously contacted with an aqueous material in a subcritical state in a presence of an acid or a base, a production system in a continuous reactor can be achieved, which results in higher productivity of the organically modified boron nitride particle.

Therefore, the invention according to a first embodiment makes it possible to provide a boron nitride particle stably and efficiently with a high organic modification ratio.

The invention according to a second embodiment provides a method, wherein the organic modifier is amphiphilic, in the invention according to a first embodiment.

The invention according to a second embodiment makes it possible to provide a uniform slurry feed as a raw material liquid, and to continuously supply the raw material liquid stably when conducting the contacting step.

The invention according to a third embodiment provides a method, wherein the organic modifier comprises any one or more kinds selected from phosphonic acids, catechols, alcohols, thiols, amines, and carboxylic acids, in the invention according to a first embodiment.

The invention according to a third embodiment makes it possible to enable, for example, NHPO$_4$— (phosphonic acid), NHCO— (carboxylic acid), or the like can be formed due to a bond between HN— or H$_2$N— with the organic modifier, as for the surface state of a nitrogen-containing ion contained in the boron nitride-containing liquid. Also, for example, BNH— (amine) or the like can be formed due to a bond between —BOH or —B(OH)$_2$ and the organic modifier, as for the surface state of a boron-containing ion contained in the boron nitride-containing liquid. Thus, a boron nitride particle with an even higher organic modification ratio can be provided stably and efficiently.

The invention according to a fourth embodiment provides a method, wherein a concentration of the organic modifier is 50 mass % or less with respect to 100 parts by mass of a raw material liquid, in the invention according to any one of first to third embodiments.

The invention according to a fourth embodiment makes it possible to suitably progress dehydrate a dehydration bonding reaction between a nitrogen-containing ion or a boron-containing ion in the raw material liquid with the organic modifier in the contacting process, which results in providing a boron nitride particle with a higher organic modification ratio can be provided more stably and efficiently.

The invention according to a fifth embodiment provides a method, wherein a temperature of the aqueous material is 150° C. or higher and 370° C. or lower, and wherein a pressure thereof is a saturation vapor pressure of the aqueous material at the temperature of the aqueous material or higher and 40 MPa or lower, in the invention according to any one of first to fourth embodiments.

The invention according to a fifth embodiment makes it possible to suitably adjust the amount of hydroxy group and amino group on the surface of the boron nitride powder, which results in the organic modification in a higher amount. Therefore, the invention according to a fifth embodiment makes it possible to provide a boron nitride particle with a high organic modification ratio more stably and efficiently.

Effect of the Invention

The present invention makes it possible to provide a boron nitride particle stably and efficiently with a high organic modification ratio.

MODE FOR CARRYING OUT THE INVENTION

Specific embodiments of the present invention are described in detail below. However, the present invention is not at all limited to the following embodiments, but can be conducted with a modification as appropriate within the scope of the purpose of the present invention.

<<Continuous Production System for Boron Nitride Particle>>

Figure 1:
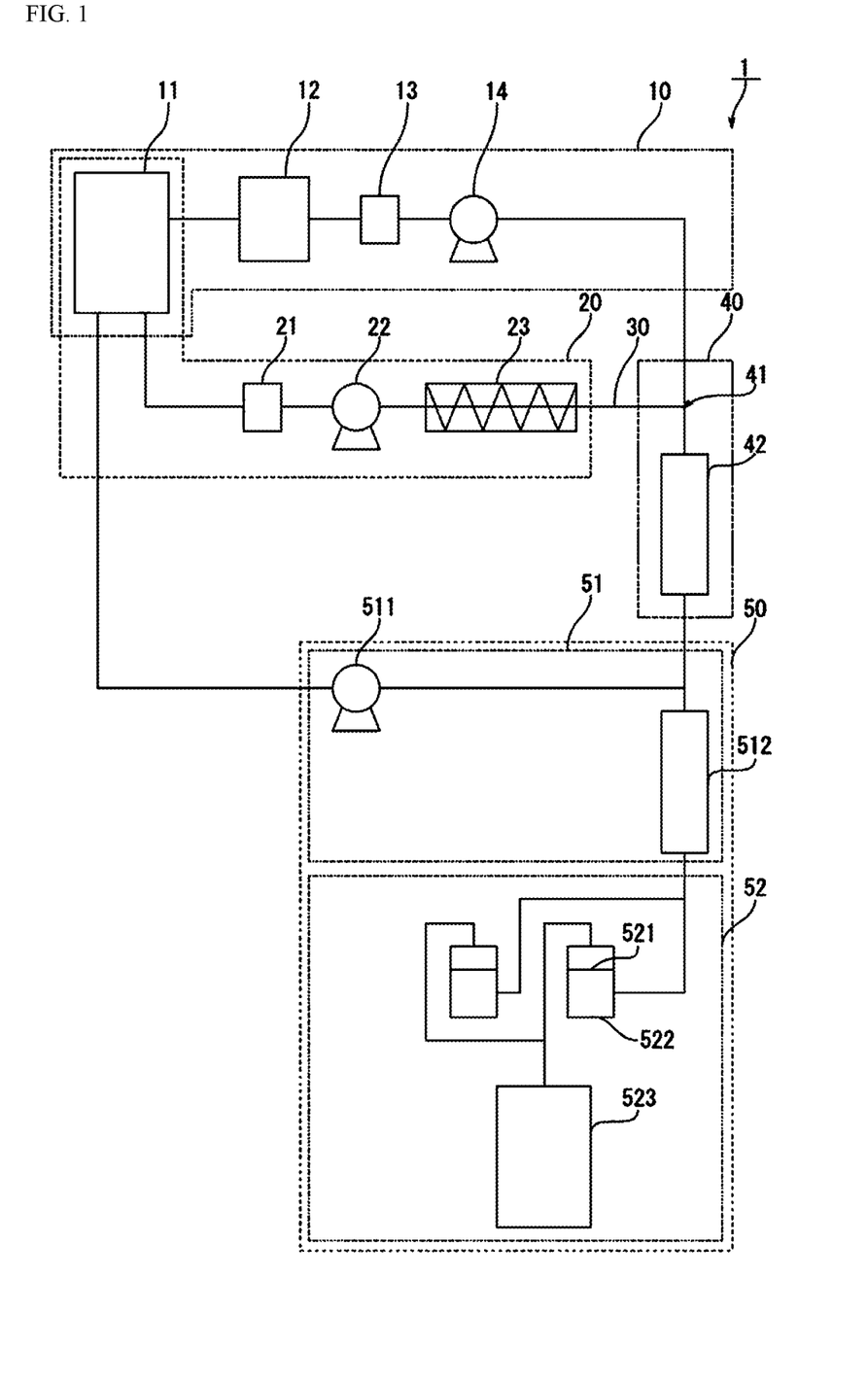
FIG. 1 is a schematic diagram of a continuous production system 1 according to the present embodiment.

FIG. 1 is a schematic diagram of a continuous production system 1 for the continuous production of boron nitride particles.

The continuous manufacturing system 1 has a raw material liquid supplying means 10, a high-temperature high-pressure means 20, an aqueous material supplying means 30, a contacting means 40, and a particle collecting means 50.

<Raw Material Liquid Supplying Means 10>

The raw material supplying liquid means 10 has a solvent storage part 11 for storing a solvent, a raw material adjusting part 12 for dissolving a raw material using a solvent supplied from the solvent storage part 11 to obtain a raw material liquid, a raw material degassing part 13 for degassing the raw material liquid, and a raw material pressurizing part 14 for pressurizing the degassed raw material liquid.

[Solvent Storage Part 11]

The solvent storage part 11 is not particularly limited as long as a solvent can be stored. Examples of the solvent storage part 11 include, for example, storage containers, storage tanks, and bottles. The solvent storage part 11 is configured to be able to supply a solvent to a raw material adjusting part 12, an aqueous material degassing part 21, and a low-temperature and high-pressure fluid preparation part 511, which are described later.

The solvent is not limited particularly as long as it is an aqueous material. The aqueous material means water, a polar organic solvent, or a mixture of water and a polar organic solvent. Examples of the aqueous material include, for example, water, alcohols, carboxylic acids, ketones, ethers, esters, amides, amines, and sulfur compounds; and such as mixtures thereof.

Examples of the alcohols include methanol, ethanol, isopropyl alcohol, t-butyl alcohol, propylene glycol, and phenol.

Examples of the carboxylic acids include lower carboxylic acids such as formic acid, acetic acid, propionic acid, butyric acid, valeric acid, and caproic acid.

Examples of the ketones include acetone, methyl ethyl ketone, and methyl isobutyl ketone.

Examples of the ethers include ethylene glycol monobutyl ether, ethylene glycol monoethyl ether, tetrahydrofuran, dioxane, and methyl cellosolve.

Examples of the esters include ethyl acetate and butyl acetate.

Examples of the amides include formamide, dimethylformamide, acetamide, dimethylacetamide, nitromethane, and acetonitrile.

Examples of the amines include methylamine, ethylamine, trimethylamine, triethylamine, monoethanolamine, diethanolamine, triethanolamine, pyridine, ethylenediamine, and hexamethylenediamine.

Examples of the sulfur compounds include dimethyl sulfoxide.

Among these, the aqueous material preferably contains one or more selected from water, alcohols, and carboxylic acids because of easy handling, and is more preferably water.

[Raw Material Adjusting Part 12]

The raw material adjusting part 12 is not particularly limited as long as the raw material can be dissolved or dispersed using a solvent supplied from the solvent storage part 11 to make a raw material liquid. Examples of the raw material adjusting part 12 include dissolution tanks and stirrers. The raw material adjusting part 12 is configured to be able to supply the raw material liquid to a raw material degassing part 13. Since the raw material liquid is made in the raw material adjusting part 12, the raw material liquid can be heated in a prescribed heating device or can be contacted with a subcritical aqueous material to organically modify a boron nitride particle continuously.

[Raw Material Liquid]

The raw material liquid in the present embodiment contains a boron nitride with pretreatment and an organic modifier. The embodiment of the raw material liquid is not particularly limited as long as it is fluid, and examples thereof include aqueous solutions, slurries, pastes, and suspensions, which contain raw material components.

If it is difficult to prepare a water slurry, the raw material can be dispersed in an aqueous material such as ethanol to make a slurry.

(Boron Nitride)

The pretreatment of boron nitride includes any one or more kinds selected from adding an acid to a boron nitride, adding a base to a boron nitride, adding an oxidant to a boron nitride, adding a reductant to a boron nitride, and conducting a hydrothermal treatment or a solvothermal treatment to a boron nitride.

Impurities in a boron nitride which is a raw material can be removed by the pretreatment.

Also, the B—N bond in a boron nitride powder as a raw material can be exchanged with, for example, —BOH and HN—, —B(OH)$_2$ and H$_2$N—, or the like, which results in enhancing the solubility in an aqueous solvent. Thus, a slurry feed can be used as a raw material liquid, and the raw material liquid can stably be supplied.

The condition for the pretreatment is not particularly limited. However, in the case where the pretreatment is a hydrothermal treatment or a solvothermal treatment, when the treatment temperature exceeds 400° C., —BOH and HN—, —B(OH)$_2$ and H$_2$N—, or the like is rather reduced, which affects the subsequent organic modification. Therefore, the treatment temperature is preferably 400° C. or lower.

(Organic Modifier)

Although not necessary, the raw material liquid may contain an organic modifier. The organic modifier is preferably amphiphilic. The amphiphilic refers to a molecule having both a polar portion and a non-polar portion.

Examples of the organic modifier having an amphiphilic property include any one or more kinds selected of phosphonic acids, catechols, alcohols, thiols, amines, and carboxylic acids.

For example, NHPO$_4$— (phosphonic acid), NHCO— (carboxylic acid), or the like can be formed due to a bond between HN— or H$_2$N— with an organic modifier, as for the surface state of a nitrogen-containing ion contained in a boron nitride-containing liquid. Also, for example, BNH— (amine) or the like can be formed due to a bond between —BOH or —B(OH)$_2$ and an organic modifier, as for the surface state of a boron-containing ion contained in a boron nitride-containing liquid. Thus, a boron nitride particle with a higher organic modification ratio can be provided stably and efficiently.

The phosphonic acids mean oxoacids of phosphorus or mean organophosphorus compounds which contain it as a parent compound and which are represented by the general formula R—P(=O)(OH)$_2$ (R is an organic group). The compound in which one carbon-phosphorus bond is formed from the organic group is called monophosphonic acid, and the compound in which two carbon-phosphorus bonds are formed from the organic group is called diphosphonic acid.

Examples of the organic group of the monophosphonic acid include, for example, alkyl groups, vinyl group, phenyl groups, alkylamino groups, and alkyl mercapto groups. Examples of the organic group of the diphosphonic acid include, for example, alkylene groups, vinylene group, acetylene group, and phenylene groups, as well as derivatives thereof.

The catechols mean compounds having a benzene ring, in which one carbon atom of six carbon atoms in the benzene ring is substituted with a hydroxyl group, and a carbon atom at the ortho position from the hydroxyl group is also substituted with a hydroxyl group. The catechols may also have a carbon atom other than the two carbon atoms having a hydroxyl group, which may be substituted with a hydroxyl group or another functional group.

Examples of the catechols include, for example, dopamine, benserazide, adrenaline, isoprenaline, dobutamine, noradrenaline, levodopa, trimethoquinol, entacapone, droxidopa, methyldopa, carbidopa, rutin, and tannic acid.

Examples of the alcohols include methanol, ethanol, isopropyl alcohol, t-butyl alcohol, propylene glycol, and phenol.

The thiols mean organic compounds having hydrogenated sulfur at the end and are represented by the general formula R—SH (R is an organic group). Examples of the thiols include, for example, pentanethiol, hexanethiol, heptanethiol, octanethiol, nonanethiol, decanethiol, undecanethiol, dodecanethiol, tridecanethiol, tetradecanethiol, pentadecanethiol, hexadecanethiol, heptadecanethiol, octadecanethiol, nonadecanethiol, eicosanethiol, pentanedithiol, hexanedithiol, heptanedithiol, octanedithiol, nonanedithiol, decanedithiol, undecanedithiol, dodecanedithiol, tridecanedithiol, tetradecanedithiol, pentadecanedithiol, hexadecanedithiol, heptadecanedithiol, octadecanedithiol, nonadecanedithiol, and eicosanedithiol.

Examples of the amines include methylamine, ethylamine, trimethylamine, triethylamine, monoethanolamine, diethanolamine, triethanolamine, pyridine, ethylenediamine, and hexamethylenediamine.

Examples of the carboxylic acids include lower carboxylic acids such as formic acid, acetic acid, propionic acid, butyric acid, valeric acid, and caproic acid.

The lower limit of the concentration of the organic modifier is not particularly limited. However, it is preferably within a range in which the dehydration bonding reaction between the nitrogen-containing ion or the boron-containing ion and the organic modifier in the raw material liquid can be conducted at a high modification ratio.

The upper limit of the concentration of the organic modifier is also not particularly limited. However, it is preferably within a range in which the deterioration of the flowability of the raw material liquid caused by the increase of the viscosity of the raw material liquid can be suppressed, and in which the dehydration bonding reaction between the nitrogen-containing ion or the boron-containing ion and the organic modifier in the raw material liquid can efficiently be conducted as a result.

(Be in Presence of an Acid or a Base)

In a contacting means 40 described later, the raw material liquid is continuously fed and is continuously contacted with an aqueous material in a subcritical state in the presence of an acid or a base.

The timing of making the acid or the base present is not particularly limited, and it is sufficient that a pipe for supplying an acid or a base is provided upstream from the position where the raw material liquid is contacted with the aqueous material in the contacting means 40. However, to simplify the configuration of the continuous manufacturing system 1, it is preferable to supply an acid or a base in the raw material adjusting part 12 to make the raw material liquid acidic or basic.

The acid or the base has a function as a catalyst for the organic modification reaction of a boron nitride. It is different depending on the type of organic modifier, whether an acid or a base is used. If the organic modifier is one or more kinds selected from phosphonic acids, catechols, alcohols, thiols, and carboxylic acids, it is preferably in the presence of an acid. The kind of the acid is not particularly limited, and examples thereof include any one or more kinds selected from hydrochloric acid, nitric acid, sulfuric acid, and boric acid.

On the other hand, if the organic modifier is amines, it is preferably in the presence of a base. The kind of the base is not particularly limited, and examples thereof include any one or more kinds selected from ammonia, sodium hydroxide, and potassium hydroxide.

To more suitably promote the organic modification reaction of a boron nitride, the pH of a contacting liquid, when the raw material liquid is contacted with the aqueous material in the contacting means 40, is between the isoelectric point pH of the boron nitride and the acid dissociation constant pKa for the acid or the base dissociation constant pKb for the base.

In the present embodiment, the acid or the base can be positioned as a catalyst to conduct the organic modification reaction in the contacting process. For example, in the presence of an acid, HN— or $H_2N$— can be bonded with an organic modifier as for the surface state of a nitrogen-containing ion contained in a boron nitride-containing liquid. Also, in the presence of a base, —BOH or —$B(OH)_2$ can be bonded with an organic modifier as for the surface state of a boron-containing ion contained in a boron nitride-containing liquid. Therefore, the present embodiment makes it possible to provide a boron nitride particle stably and efficiently with a higher organic modification ratio.

[Raw Material Degassing Part 13]

The raw material degassing part 13 is not particularly limited as long as the raw material liquid can be degassed. Examples of the raw material degassing part 13 include, for example, degassing apparatuses of known arts such as degassing apparatuses in which ultrasonic wave is used, degassing apparatuses in which the pressure is reduced, degassing apparatuses in which a noble gas is transferred into the raw material liquid, and degassing apparatuses in which a permeation membrane is used, as well as degassing apparatuses in which these degassing apparatuses of known arts are combined. By degassing the raw material liquid, the fluctuation of the raw material liquid supply, which is caused by a bubble or the like generated by a dissolved gas, can be suppressed. Also, the corrosion of the raw material pressurizing part 14, the contacting means 40, and the particle collecting means 50 due to dissolved oxygen can be avoided.

[Raw Material Pressurizing Part 14]

The raw material pressurizing part 14 is not particularly limited as long as the material liquid can be pressurized. Examples of the raw material pressurizing part 14 include, for example, pressurizing pumps. By pressurizing the raw material liquid, the raw material liquid in a high-pressure state can be continuously supplied to the contacting means 40.

[High-Temperature High-Pressure Means 20]

The high-temperature high-pressure means 20 is then described. The high-temperature high-pressure means 20 has the solvent storage part 11 described above, an aqueous material degassing part 21 for degassing the aqueous material supplied from the solvent storage part 11, a pressurizing part 22 for pressurizing the degassed aqueous material, and a heating part 23 for heating the pressurized aqueous material.

[Aqueous Material Degassing Part 21]

The aqueous material degassing part 21 is not particularly limited as long as the aqueous material can be degassed. Examples of the aqueous material degassing part 21 include, for example, degassing apparatuses of known arts such as degassing apparatuses in which ultrasonic wave is used, degassing apparatuses in which the pressure is reduced, degassing apparatuses in which a noble gas is transferred into the raw material liquid, and degassing apparatuses in which a permeation membrane is used, as well as degassing apparatuses in which these degassing apparatuses of known arts are combined. By degassing the aqueous material, the fluctuation of the aqueous material supply, which is caused by a bubble or the like generated by a dissolved gas, can be suppressed. Also, the corrosion of the pressurizing part 22, the heating part 23, the contacting means 40, and the particle collecting means 50 due to dissolved oxygen can be avoided.

[Pressurizing Part 22]

The pressurizing part 22 is not particularly limited as long as the aqueous material can be pressurized. Examples of the pressurizing part 22 include, for example, pressurizing pumps. By pressurizing the aqueous material and by heating it with a heating part 23, the aqueous material can become in a subcritical state and can be continuously supplied to the contacting means 40.

The aqueous material after pressurization is preferably in a subcritical state. This is because, in the case where the aqueous material is in a supercritical state, a smaller amount of hydroxy group and amino group is formed on a boron nitride powder surface than in the case where it is in a subcritical state, which may affect the subsequent organic modification.

The pressure of the aqueous material after pressurization is the saturation vapor pressure or higher. If the pressure is less than the saturated vapor pressure, it is undesirable because the organically modified boron nitride particle cannot be made even if the aqueous material is contacted with the raw material liquid.

To optimize the amount of hydroxy group and amino group on the surface of the boron nitride powder and to allow the subsequent organic modification to proceed more suitably, the pressure of the aqueous material after pressurization is preferably 0.5 MPa or higher, is more preferably 10 MPa or higher, and further preferably 20 MPa or higher.

The pressure of the aqueous material after pressurization is 40 MPa or less. If it is higher than 40 MPa, it is undesirable because the cost of enhancing the pressure resistance of the continuous production system 1 is significantly increased and the contacting means 40 is also easily deteriorated.

From the viewpoint of reducing the cost related to pressure resistance of the continuous production system 1, the pressure of the aqueous material after pressurization is preferably 37 MPa or lower. In addition, from the viewpoint of suppressing the deterioration of the contacting means 40, the pressure of the aqueous material after pressurization is more preferably 35 MPa or less. These make the cost related to the pressure resistance of the continuous production system 1 reduced and also make the deterioration of the contacting means 40 suppressed.

[Heating Part 23]

The heating part 23 is not particularly limited as long as it can heat the aqueous material. Examples of the heating part 23 include heating devices in which microwaves are irradiated to the aqueous material and heating devices in which the aqueous material is heated by heat conduction from a heating element such as a heater or the like. The heating part 23 can heat the aqueous material to make the aqueous material be in a subcritical state.

The temperature of the aqueous material after heating is 150° C. or higher. If the temperature is lower than 150° C., it is undesirable because the aqueous material and the organic modifier cannot form a homogeneous phase. It is also undesirable because the formation of a bond by dehydration reaction is not expected.

To optimize the amount of hydroxy group and amino group on the surface of the boron nitride powder and to allow the subsequent organic modification to proceed more suitably, the temperature of the aqueous material after heating is preferably 200° C. or higher, is more preferably 250° C. or higher, and further preferably 300° C. or higher.

The temperature of the aqueous material after heating is 370° C. or lower, and is preferably 350° C. or lower. If the temperature of the aqueous material is too high, it is undesirable because the amount of hydroxy group and amino group on the surface of the boron nitride powder is rather reduced.

The heating part 23 is sloped forward and downward, for example. In the case where the flow velocity of the aqueous material is low, the aqueous material having a low density by heating tends to move upward and high-temperature high-pressure water flows back through the heating part 23, whereby the temperature may not be controlled. To be able to prevent such backflow, a restricting part is preferably provided between a plurality of heating means described above. The restricting part is not particularly limited as long as it prevents backflow. Examples of the restricting part include, for example, configurations using a narrow tube, a spiral tube, or the like.

[Aqueous Material Supplying Means 30]

The aqueous material supplying means 30 is constituted with piping. The aqueous material supplying means 30 has a function to enable high-temperature, high-pressure aqueous material obtained by the high-temperature high-pressure means 20 to be continuously supplied toward the contacting means 40.

The area around the connection part of the aqueous material supplying means 30 with the contacting means 40 is preferably formed in an abbreviated vertical direction and is preferably connected with the contacting means 40 at the lower end. In this configuration, the high-temperature high-pressure aqueous material is guided in an abbreviated vertical direction from the upper side to the lower side.

[Contacting Means 40]

The contacting means 40 has a mixing part 41 for mixing the raw material liquid continuously supplied from the raw material liquid supplying means 10 with the aqueous material supplied from the aqueous material supplying means 30, and a reaction treatment part 42 for providing a hydroxy group (hydroxyl group) to the surface of a boron nitride, which is a reaction product of the raw material liquid and the aqueous material.

[Mixing Part 41]

The mixing part 41 is not particularly limited as long as it mixes the raw material liquid and the aqueous material.

Figure 2:
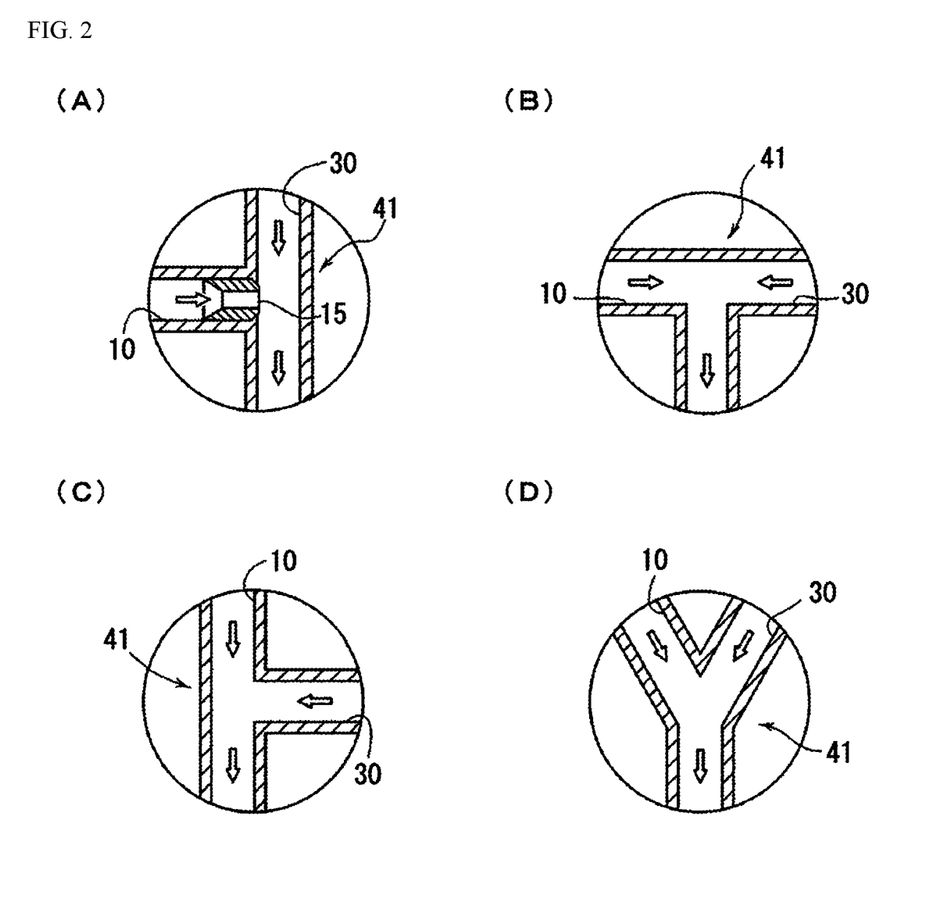
FIG. 2 is a schematic diagram of a mixing part 41 according to the present embodiment.

FIG. 2 is a schematic diagram showing one example of the mixing part 41. As shown in FIG. 2(A), the mixing part 41 preferably has a configuration in which a nozzle 15 formed at the end of the raw material liquid supplying means 10 is faced to the high-temperature high-pressure aqueous material supplied from the aqueous material supplying means 30 to eject the raw material liquid from the tip of the nozzle 15. The ejection of the raw material liquid from the tip of the nozzle 15 makes it possible to mix the raw material liquid and the aqueous material rapidly to promote reaction efficiency. Also, in the phase-separated raw material liquid, the ejection of the raw material liquid from the tip of the nozzle 15 makes it possible to disperse the raw material liquid in a fine particle state in the aqueous material and to form a fine emulsion of the raw material in the raw material liquid in the high-temperature high-pressure aqueous material to further promote the reaction efficiency.

The mixing part 41 is not particularly limited as long as it mixes the aqueous material and the raw material liquid, and may have any other configuration. For example, as shown in FIG. 2(B), it may be configured to mix the aqueous material guided from an abbreviated horizontal direction with the raw material liquid guided from an abbreviated horizontal direction. As shown in FIG. 2(C), it may be configured to mix the aqueous material guided from an abbreviated horizontal direction with the raw material liquid guided from an abbreviated vertical direction. As shown in FIG. 2(D), it may be configurated to mix the aqueous material guided from the diagonally upward direction with the raw material liquid guided from the diagonally upward direction.

In the mixing part 41, the raw material liquid is instantly heated to a subcritical temperature by the heat possessed by the aqueous material supplied from the aqueous material supplying means 30 to initiate the reaction between the raw material liquid and the aqueous material. This reaction initiates the surface treatment reaction of a boron nitride particle.

Figure 3:
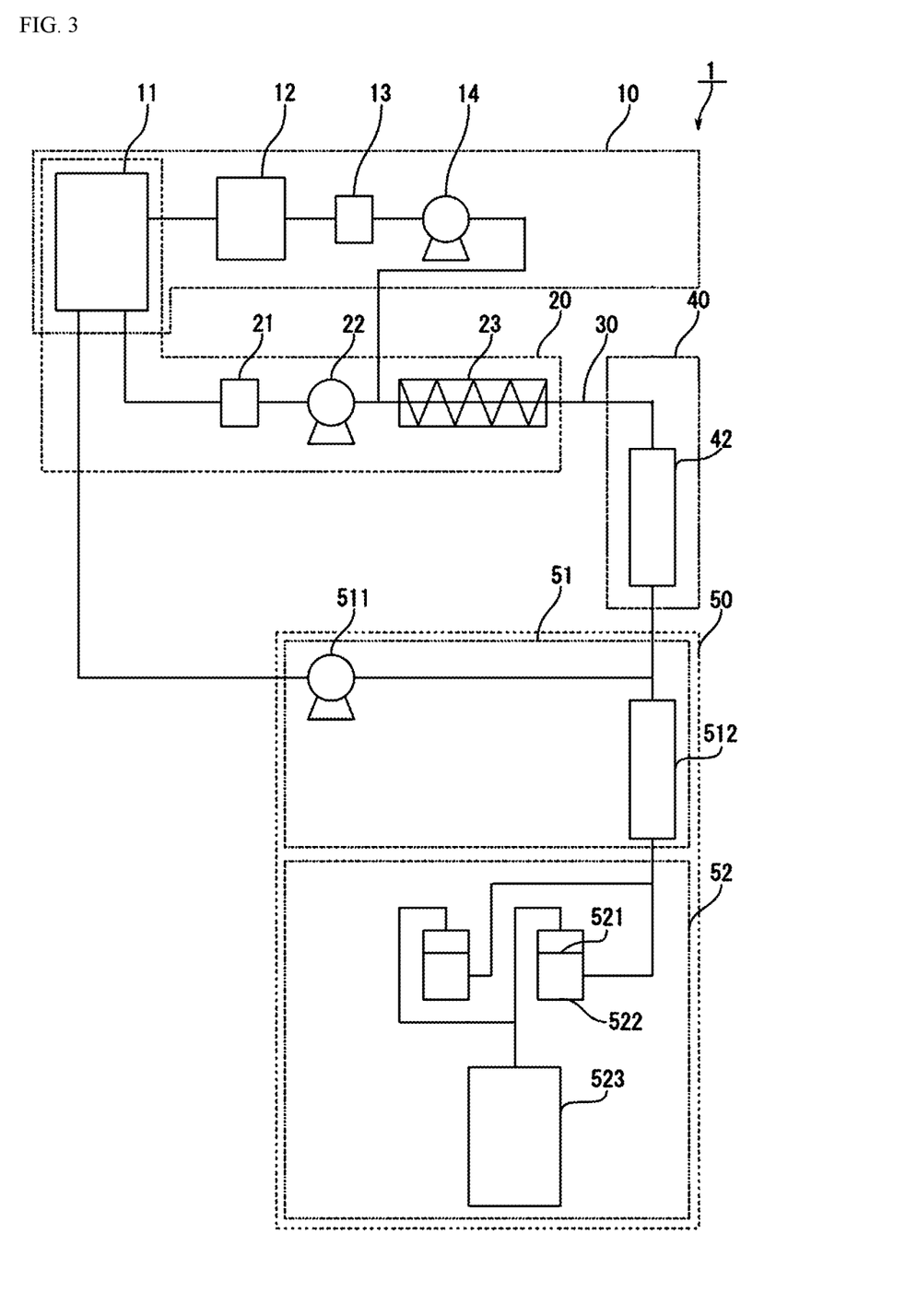
FIG. 3 is a schematic diagram of a continuous production system 1, which is a different embodiment from FIG. 1.

The mixing part 41 is not an essential component. Although the mixing part 41 may be provided to achieve rapid mixing, the mixing part 41 may not be required. In this case, as shown in FIG. 3, the raw material slurry supplied from the raw material adjusting part 12 is passed directly through the heating part 23. In this case, the heating temperature is preferably about 350° C.

[Reaction Processing Part 42]

Return to FIG. 1. The reaction processing part 42 is not particularly limited as long as a subcritical state, which is a reaction condition of a boron nitride particle, is maintained for a predetermined time. Examples of the reaction processing part 42 include spiral tubes wound multiple times inside a heating cylinder and reactors covered with a thermostatic layer such as a molten salt bath jacket, a fluidized sand bath, or the like.

The reaction processing part 42, which is a spiral tube wound multiple times inside a heating cylinder or is a reactor covered with a thermostatic layer, makes it possible to prevent the temperature change or the temperature unevenness of the mixture of the raw material liquid and aqueous material due to heat conduction through the wall surface from the mixing part 41 and to achieve a precise temperature control required for the particle synthesis in a subcritical state.

A hydrocyclone can also be installed downstream of the reaction processing part 42. The hydrocyclone enables separating the reaction product from the fluid and controlling the reactor temperature by the pressure of the fluid. The configuration with a hydrocyclone is preferable because it can enhance the collection yield of the reaction product and can also enhance the controllability of the reactor temperature. The configuration, in which the reaction processing part 42 is formed in an abbreviated vertical direction so that the mixture of raw material liquid and aqueous material flows from the mixing part 41 at the upper side to the hydrocyclone at the lower side, is preferable because the temperature in the reaction processing part 42 can easily uniformly be maintained.

When the reaction product of the raw material liquid and aqueous material is passed through the reaction processing part 42, a high-temperature high-pressure fluid containing a boron nitride particle having a hydroxy group (hydroxyl group) attached to the surface is discharged from an outlet of the reaction processing part 42.

To conduct the surface treatment of the particle and to enhance the productivity of the particle, the reaction processing part 42 is preferably configured such that the reaction time of the fluid containing the raw material liquid and the aqueous material is 5 minutes or more. To further promote the surface treatment of the particle, it is more preferably configured such that the reaction time is 10 minutes or more.

To suppress the degradation of the reaction processing part 42, the reaction processing part 42 is preferably configured such that the reaction time of the fluid containing the raw material liquid and the aqueous material is 30 minutes or less. To further suppress the degradation, it is more preferably configured such that the reaction time is 20 minutes or less.

[Particle Collecting Means 50]

The particle collecting means 50 is configured such that it has a high-temperature high-pressure fluid cooling part 51, in which a particle-containing high-temperature high-pressure fluid discharged from the reaction processing part 42 is cooled, and a particle collection part 52, in which the particle from the particle-containing high-temperature high-pressure fluid is collected.

[High-Temperature High-Pressure Fluid Cooling Part 51]

The high-temperature high-pressure fluid cooling part 51 has a low-temperature high-pressure fluid preparation part 511, in which an aqueous material supplied from the solvent storage part 11 is pressurized to make a low-temperature high-pressure fluid, and a fluid mixing part 512 in which the low-temperature high-pressure fluid is added to the particle-containing high-temperature high-pressure fluid to make a particle-containing low-temperature high-pressure fluid.

(Low-Temperature High-Pressure Fluid Preparation Part 511)

The low-temperature high-pressure fluid preparation part 511 is not particularly limited as long as an aqueous material supplied from the solvent storage part 11 is pressurized to make a low-temperature high-pressure fluid. Examples of the low-temperature high-pressure fluid preparation part 511 include pressurizing pumps. By pressurizing the aqueous material, the low-temperature high-pressure fluid can be continuously supplied to the fluid mixing part 512.

Although not required, it may be configured such that the organic modifier described above can be supplied from the low-temperature high-pressure fluid preparation part 511. In this case, the boron nitride particle is organically modified by heating in the fluid mixing part 512. In this case, it is not required to rapidly raise the temperature.

Enabling the supply of the organic modifier from the low-temperature high-pressure fluid preparation part 511 can provide a continuous process that separately has a surface treatment in which the surface of a boron nitride particle is reacted to give a hydroxy group (hydroxyl group) on the surface of the boron nitride particle, and an organic modification treatment of the particle after the surface treatment. By separating the former treatment and the latter treatment, it is possible to separate an optimum condition for the former treatment from an optimum condition for the latter treatment.

The former treatment and the latter treatment can be conducted together. In this case, the organic modifier can be mixed with the raw material or can be supplied at a later step in the raw material pressurizing part 14.

(Fluid Mixing Part 512)

The fluid mixing part 512 is not particularly limited as long as it mixes the low-temperature high-pressure fluid supplied from the low-temperature high-pressure fluid preparation part 511 and the high-temperature high-pressure fluid supplied from the contacting means 40 are mixed to transfer it to the particle collection part 52. The fluid mixing part 512 is, for example, configured as a tube, around one end of which the low-temperature high-pressure fluid preparation part 511 and the contacting means 40 are connected, and around the other end of which the particle collection part 52 is connected.

By mixing the low-temperature high-pressure fluid with the high-temperature high-pressure fluid, the heat associated with the change of the fluid state, i.e., the heat corresponding to the evaporation latent heat, can be quickly removed to conduct a safe and stable operation. Further, if the high-temperature high-pressure fluid is cooled to the critical temperature or lower by this mixing, the high-temperature high-pressure fluid can rapidly be cooled to terminate the reaction for producing a particle almost instantly. Therefore, the particles that are a product can have an almost uniform particle diameter. By transferring the particle-containing low-temperature high-pressure fluid mixed with the cooled low-temperature high-pressure fluid and the high-temperature high-pressure fluid to the particle collection part 52, the organically modified boron nitride particle can be collected from the particle-containing low-temperature high-pressure fluid.

The fluid mixing part 512 preferably further has a structure for externally cooling the particle-containing low-temperature high-pressure fluid whose temperature dropped to the critical temperature or lower. By further having a structure for externally cooling the particle-containing low-temperature high-pressure fluid whose temperature dropped to the critical temperature or lower, the temperature of the particle-containing low-temperature high-pressure fluid can be lowered to a temperature suitable for collecting the particle in the particle collection part 52 while suppressing reducing the consumption of the low-temperature high-pressure fluid and the concentration of the particle in the mixed fluid.

[Particle Collection Part 52]

The particle collection part 52 is configured to have a filter 521, in which the solid-liquid separation is performed from the particle-containing low-temperature high-pressure fluid into the particle and the low-temperature high-pressure fluid; a particle pool 522, which is installed at the lower side to the direction of gravity from the filter 521, in which the particle separated by the filter 521 is collected; and a drainage tank 523, in which the low-temperature high-pressure fluid separated by the filter 521 is drained.

(Filter 521)

The filter 521 is not particularly limited as long as it separates the particle and the low-temperature high-pressure fluid from the particle-containing low-temperature high-pressure fluid supplied from the lower side along the direction of gravity. Examples of the filter 521 include in-line filters. The filter 521 separates the particle from the low-temperature high-pressure fluid, whereby the organically modified boron nitride particle can be collected. Since the particle-containing low-temperature high-pressure fluid is supplied to the filter 521 from the lower side along the direction of gravity, the particle collected by the filter 521 falls by gravity into the particle pool 522 located at the lower side to the direction of gravity. Therefore, the formation of a filter cake on the surface of the filter 521 is suppressed, whereby the clogging of the filter 521 due to the accumulation of the filter cake can be alleviated. This allows stable operation over a long period and also makes it easier to collect the particle.

The filter 521 may be a fixed type or may be a movable piston type.

(Particle Pool 522)

The particle pool 522 is not particularly limited as long as it collects the particle which falls from the filter 521. By collecting the particle which falls from the filter 521 with the particle pool 522, the particle generated by the contacting means 40 and cooled by the high-temperature high-pressure fluid cooling part 51 can be collected.

In the present embodiment, the particle collection part 52 is divided into multiple flow paths. By dividing it into multiple flow paths, the product pooled in the particle pool 522 can be collected at normal pressure while switching the device to be collected.

(Drainage Tank 523)

The drainage tank 523 is not particularly limited as long as it collects the low-temperature high-pressure fluid separated by the filter 521. The drainage tank 523 has a volume, strength, corrosion resistance, and the like which are suitable for storing the low-temperature, high-pressure fluid.

<Method for Continuously Producing Organically Modified Boron Nitride Particle>

Next, the method for continuously producing an organically modified boron nitride particle is described.

[Formation and Pressurization of Raw Material Liquid]

The solvent stored in the solvent storage part 11 is supplied to the raw material adjusting part 12. In the raw material adjusting part 12, boron nitride which is the raw material is dissolved in the solvent supplied to form the raw material liquid. The raw material liquid formed is degassed in the raw material degassing part 13 and is transferred to the raw material pressurizing part 14. The raw material liquid degassed is pressurized in the raw material pressurizing part 14 and is transferred to the mixing part 41.

[Formation of High-Temperature High-Pressure Aqueous Material]

Simultaneously with the formation and pressurization of the raw material liquid described above, the solvent stored in the solvent storage part 11 is supplied to the aqueous material degassing part 21. The solvent supplied is degassed in the aqueous material degassing part 21 and is transferred to the pressurizing part 22. The aqueous material degassed is pressurized in the pressurizing part 22, and further is transferred to the heating part 23 and is heated to be in a subcritical or supercritical state. The aqueous material in a subcritical or supercritical state is then transferred to the mixing part 41 via the aqueous material supplying means 30.

[Contact Between Raw Material Liquid and Aqueous Material]

The raw material liquid pressurized in the raw material pressurizing part 14 and the aqueous material in a subcritical state transferred from the aqueous material supplying means 30 are contacted in the mixing part 41 to form the high-temperature high-pressure fluid. The high-temperature high-pressure fluid is then transferred to the reaction processing part 42. The surface treatment reaction proceeds by retaining the high-temperature high-pressure fluid, which is in a subcritical state, in the reaction processing part 42 to modify the surface of a boron nitride particle with a hydroxy group (hydroxyl group). The high-temperature high-pressure fluid is then transferred to the fluid mixing part 512.

[Cooling of High-Temperature and High-Pressure Fluid]

The high-temperature high-pressure fluid supplied from the reaction processing part 42 is mixed, in the fluid mixing part 512, with the low-temperature high-pressure fluid obtained by pressurizing the solvent stored in the solvent storage part 11 by the low-temperature high-pressure fluid preparation part 511. By this mixing, the high-temperature high-pressure fluid is cooled to terminate the organic modification reaction of a particle, and becomes a low-temperature high-pressure fluid containing an organically modified boron nitride particle. The low-temperature high-pressure fluid is transferred to the filter 521.

[Collection of Particle]

The particle-containing low-temperature high-pressure fluid transferred from the fluid mixing part 512 is supplied to the filter 521 from the lower side along the direction of gravity to separate an organically modified boron nitride particle and the low-temperature high-pressure fluid. The organically modified boron nitride particle falls by gravity and is collected in the particle pool 522 which is installed at the lower side to the direction of gravity. The low-temperature high-pressure fluid passed through the filter 521 is collected to the drainage tank 523.

Since the continuous production system is used, the raw material liquid and the aqueous material are supplied from a system inlet and the organically modified boron nitride particle is drained from a system outlet, to realize a production system in a continuous reactor and to enhance the productivity of organically modified boron nitride particle.

Thus, the present invention makes it possible to provide a boron nitride particle stably and efficiently with a high organic modification ratio.

<<Continuous Production Equipment for Boron Nitride Particle According to a Variant Embodiment>>

Figure 4:
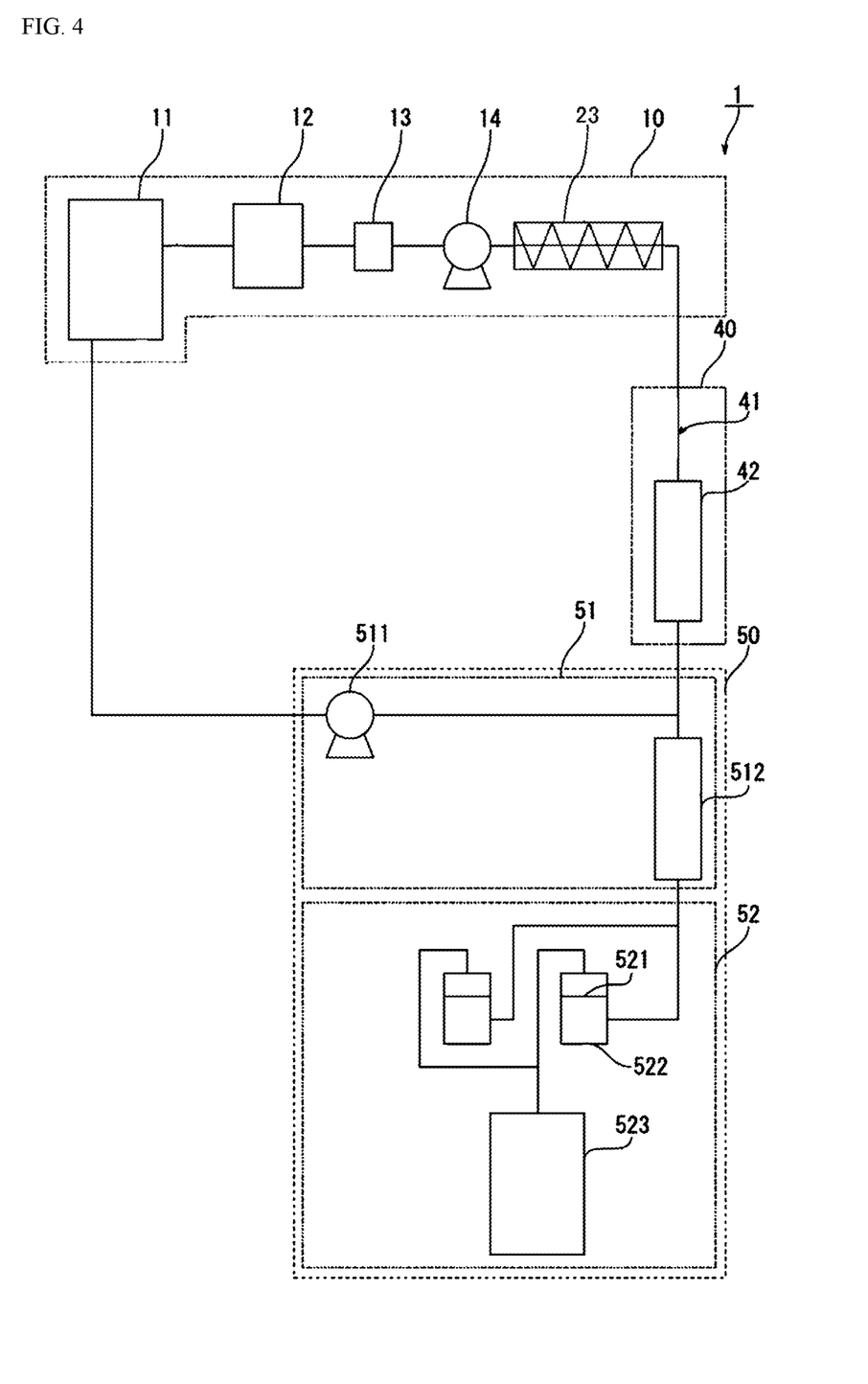
FIG. 4 is a schematic diagram of a continuous production system 1 according to a variant embodiment.

FIG. 4 is a schematic diagram of a continuous production system 1 according to a variant embodiment.

In this embodiment, the raw material liquid supplying means 10 is configured in a separate route from that of the high-temperature high-pressure means 20 and the aqueous material supplying means 30, in which an outlet of the raw material liquid supplying means 10 and an outlet of the aqueous material supplying means 30 join at an inlet of the contacting means 40. However, it is not limited. As shown in FIG. 4, a heating part 23 may be provided between an outlet of the raw material pressurizing part 14 and the inlet of the contacting means 40 to make the raw material liquid supplying means 10, high-temperature high-pressure means 20, and aqueous material supplying means 30 be configured in one route. According to the continuous manufacturing system 1 according to a variant embodiment, the system configuration can be further simplified.

DENOTATION OF REFERENCE NUMERALS

1 Continuous production system
10 Raw material supplying means
11 Solvent storage part
12 Raw material adjusting part
13 Raw material degassing part
14 Raw material pressurizing part
15 Nozzle
20 High-temperature high-pressure means
21 Aqueous material degassing part
22 Pressurizing part
23 Heating part
30 Aqueous material supplying means
40 Contacting means
41 Mixing part
42 Reaction processing part
50 Particle collecting means
51 High-temperature high-pressure fluid cooling part
511 Low-temperature high-pressure fluid preparation part
512 Fluid mixing part
52 Particle collection part
521 Filter
522 Particle pool
523 Drainage tank

What is claimed is:

1. A method for continuously producing an organically modified boron nitride particle, comprising:
    conducting a pretreatment to produce a pretreated boron nitride powder, the pretreatment consisting essentially of any one or more kinds selected from adding an acid to a boron nitride powder, adding a base to a boron nitride powder, adding an oxidant to a boron nitride powder, adding a reductant to a boron nitride powder, and conducting a hydrothermal treatment at a temperature of 400° C. or lower or a solvothermal treatment at a temperature of 400° C. or lower to a boron nitride powder, to exchange B—N bond in the boron nitride powder as a raw material with —BOH and HN— and/or —B(OH)$_2$ and H$_2$N—;
    after the pretreatment, adding an aqueous solvent to the pretreated boron nitride powder to disperse the pretreated boron nitride powder uniformly in the aqueous solvent; and
    conducting a contacting step in which the pretreated boron nitride powder dispersed in the aqueous solvent and an untreated organic solvent are contacted in a continuous feed manner with an aqueous material in a subcritical state in presence of an acid or a base.

2. The method according to claim 1, wherein the organic modifier is amphiphilic.

3. The method according to claim 1, wherein the organic modifier comprises any one or more kinds selected from phosphonic acids, catechols, alcohols, thiols, amines, and carboxylic acids.

4. The method according to claim 1, wherein a temperature of the aqueous material is 150° C. or higher and 370° C. or lower, and wherein a pressure thereof is a saturation vapor pressure of the aqueous material at the temperature of the aqueous material or higher and 40 MPa or lower.

5. A method for continuously producing an organically modified boron nitride particle, comprising:
    conducting a pretreatment to produce a pretreated boron nitride powder, the pretreatment consisting essentially of any one or more kinds selected from adding an acid to a boron nitride powder, adding a base to a boron nitride powder, adding an oxidant to a boron nitride powder, adding a reductant to a boron nitride powder, and conducting a hydrothermal treatment at a temperature of 400° C. or lower or a solvothermal treatment at a temperature of 400° C. or lower to a boron nitride powder, to exchange B—N bond in the boron nitride powder as a raw material with —BOH and HN— and/or —B(OH)$_2$ and H$_2$N—;
    after the pretreatment, adding an aqueous solvent to the pretreated boron nitride powder and an untreated organic modifier to disperse the boron nitride powder uniformly in the aqueous solvent; and
    conducting a contacting step in which the pretreated boron nitride powder and the untreated organic modifier dispersed in the aqueous solvent are contacted in a continuous feed manner with an aqueous material in a subcritical state in presence of an acid or a base.

6. The method according to claim 5, wherein the organic modifier is amphiphilic.

7. The method according to claim 5, wherein the organic modifier comprises any one or more kinds selected from phosphonic acids, catechols, alcohols, thiols, amines, and carboxylic acids.

8. The method according to claim 5, wherein a temperature of the aqueous material is 150° C. or higher and 370° C. or lower, and wherein a pressure thereof is a saturation vapor pressure of the aqueous material at the temperature of the aqueous material or higher and 40 MPa or lower.

* * * * *